(12) United States Patent
Wood (10) Patent No.: US 8,971,330 B2
(45) Date of Patent: *Mar. 3, 2015

(54) QUALITY OF SERVICE AND ENCRYPTION OVER A PLURALITY OF MPLS NETWORKS

(75) Inventor: Daniel M. Wood, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2340 days.

This patent is subject to a terminal disclaimer.

(21) Appl. No.: 11/609,096

(22) Filed: Dec. 11, 2006

(65) Prior Publication Data

US 2008/0137657 A1    Jun. 12, 2008

(51) Int. Cl.
*H04L 12/28* (2006.01)
*H04L 12/707* (2013.01)
*H04L 12/701* (2013.01)
*H04L 12/715* (2013.01)
*H04L 12/725* (2013.01)
*H04L 12/723* (2013.01)
*H04L 12/801* (2013.01)
*H04L 29/06* (2006.01)

(52) U.S. Cl.
CPC ............... *H04L 45/22* (2013.01); *H04L 45/00* (2013.01); *H04L 45/04* (2013.01); *H04L 45/302* (2013.01); *H04L 45/308* (2013.01); *H04L 45/50* (2013.01); *H04L 47/10* (2013.01); *H04L 63/0428* (2013.01)
USPC .............. 370/395.2; 370/395.5; 370/401; 370/409; 370/469

(58) Field of Classification Search
USPC ........................................................ 370/468
See application file for complete search history.

(56) References Cited

U.S. PATENT DOCUMENTS

| | | | |
|---|---|---|---|
| 7,068,654 B1* | 6/2006 | Joseph et al. ................. | 370/392 |
| 7,411,955 B2* | 8/2008 | Li et al. ........................ | 370/392 |
| 7,477,657 B1* | 1/2009 | Murphy et al. ............... | 370/468 |
| 2001/0019554 A1* | 9/2001 | Nomura et al. ............... | 370/389 |
| 2002/0191572 A1* | 12/2002 | Weinstein et al. ............ | 370/338 |
| 2003/0043745 A1* | 3/2003 | Kano et al. .................... | 370/238 |
| 2003/0053414 A1* | 3/2003 | Akahane et al. .............. | 370/216 |
| 2003/0053450 A1* | 3/2003 | Kubota et al. ................. | 370/356 |
| 2003/0081595 A1* | 5/2003 | Nomura et al. ............... | 370/353 |
| 2003/0147352 A1* | 8/2003 | Ishibashi et al. .............. | 370/248 |
| 2003/0188026 A1* | 10/2003 | Denton et al. ................. | 709/249 |
| 2004/0076154 A1* | 4/2004 | Mizutani et al. .............. | 370/389 |
| 2004/0114595 A1* | 6/2004 | Doukai .......................... | 370/389 |
| 2004/0196843 A1* | 10/2004 | Zinin .............................. | 370/389 |
| 2004/0221051 A1* | 11/2004 | Liong et al. ................... | 709/230 |
| 2005/0177749 A1* | 8/2005 | Ovadia ........................... | 713/201 |
| 2005/0262264 A1* | 11/2005 | Ando et al. .................... | 709/233 |
| 2006/0015450 A1* | 1/2006 | Guck et al. ..................... | 705/39 |
| 2006/0294219 A1* | 12/2006 | Ogawa et al. ................. | 709/224 |
| 2007/0071029 A1* | 3/2007 | White et al. ................... | 370/466 |

(Continued)

OTHER PUBLICATIONS

RFC 3209, RSVP-TE: Extensions to RSVP for LSP Tunnels, Awduche, et al.*

*Primary Examiner* — Alvin Zhu (57) ABSTRACT

A network device may transmit a request to each of a plurality of multi-protocol label switching (MPLS) networks for a label switched path (LSP) label, wherein each LSP label provides a defined quality of service connection through a corresponding MPLS network. The network device may then receive from each of the plurality of MPLS networks a corresponding LSP label and transmit at least one LSP label to each of a plurality of network devices, wherein the defined quality of service connection is provided through each of the plurality of MPLS networks.

20 Claims, 8 Drawing Sheets

(56) References Cited

U.S. PATENT DOCUMENTS

| | | | |
|---|---|---|---|
| 2007/0133559 A1* | 6/2007 | Ko et al. | 370/395.21 |
| 2007/0211735 A1* | 9/2007 | Williamson | 370/401 |
| 2008/0002699 A1* | 1/2008 | Rajsic | 370/392 |
| 2008/0112410 A1* | 5/2008 | Wood | 370/392 |

* cited by examiner

| SESSION | DEVICES | NETWORK | LSP | NETWORK | LSP |
|---|---|---|---|---|---|
| QoS1 | 160-1/160-2 | 120-1 | LSP1/LSP3 | 120-2 | LSP2/LSP4 |
| QoS2 | 160-1/160-2 | 120-1 | LSP5/LSP7 | 120-2 | LSP6/LSP8 |

QUALITY OF SERVICE AND ENCRYPTION OVER A PLURALITY OF MPLS NETWORKS

BACKGROUND INFORMATION

In order to send data with a desired Quality of Service (QoS) over a group of networks, such as encrypted Multiprotocol Label Switching (MPLS) networks, a signal is sent from the communicating networks through the group of MPLS networks identifying the desired QoS. A result of sending the signal through the group of MPLS networks is that outside parties monitoring the network signals may be alerted to the fact that the data to be transmitted with a desired QoS may contain sensitive information.

DETAILED DESCRIPTION

The following detailed description of the exemplary embodiments refers to the accompanying drawings. The same reference numbers in different drawings may identify the same or similar elements. Also, the following detailed description does not limit the embodiments. Systems and methods described herein may provide requested quality of service transmissions over encrypted MPLS networks.

Figure 1:
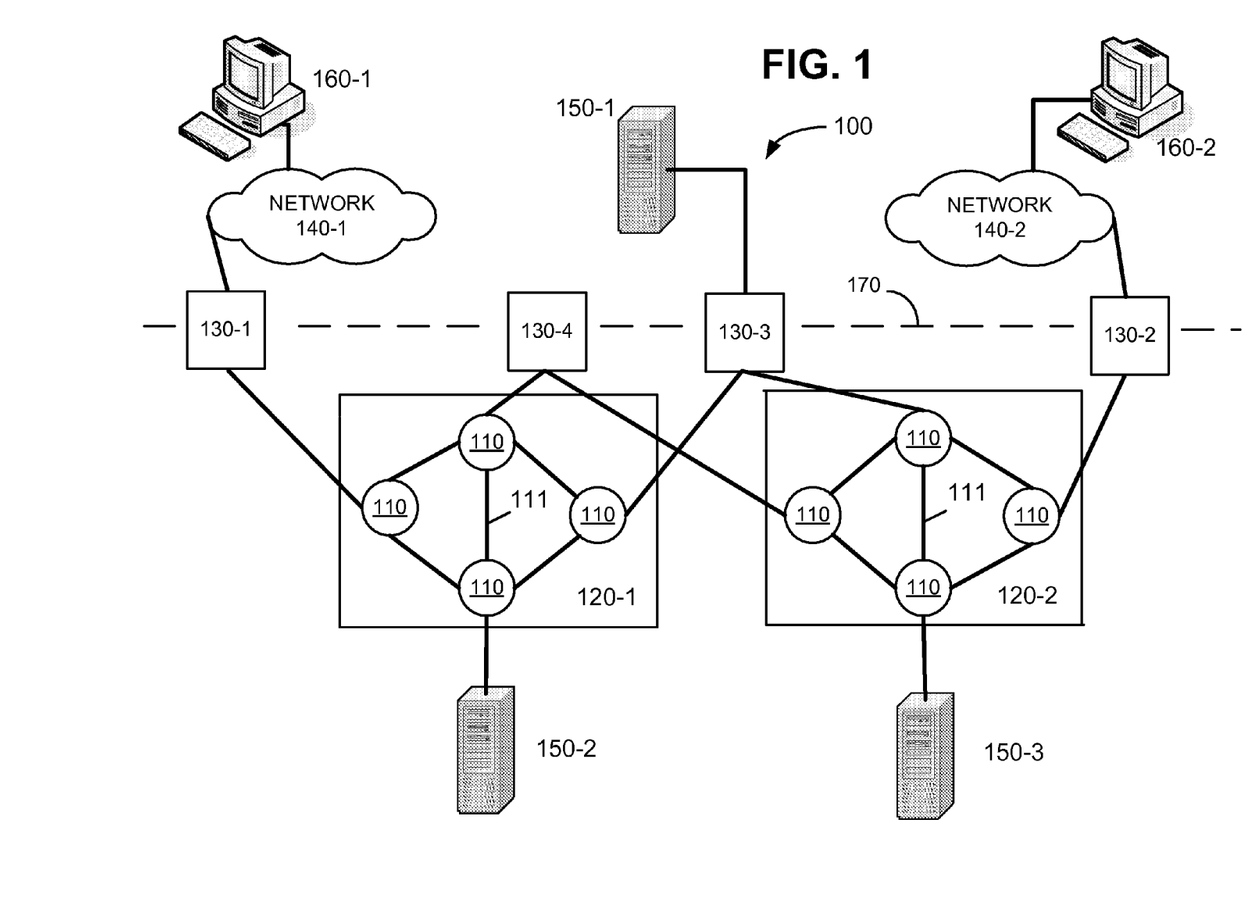
FIG. 1 is a diagram illustrating an exemplary system in which systems and methods consistent with the embodiments described herein may be implemented.

FIG. 1 is a diagram illustrating an exemplary system 100 in which systems and methods described herein may be implemented. In one implementation, system 100 may include, for example, a group of network devices 110, connected by a group of links 111 that may form MPLS networks 120-1 and 120-2 (referred to collectively as "MPLS networks 120"). System 100 may further include a group of MPLS encryptors 130-1, 130-2, 130-3 and 130-4 (referred to collectively as "MPLS encryptors 130"), a group of networks 140-1 and 140-2 (referred to collectively as networks 140"), a group of servers 150-1, 150-2 and 150-3 (referred to collectively as "servers 150"), and a group of client devices 160-1 and 160-2 (referred to collectively as client devices 160"). It should be understood that the number of components shown in system 100 is exemplary. In practice system 100 may include more or fewer components than shown in FIG. 1.

Network devices 110 may include any network device, such as a computer, a router, a switch, a network interface card (NIC), a hub, a bridge, etc. In one implementation, network devices 110 may include label switching routers (LSRs). Network devices 110 may include one or more input ports and output ports that permit communications to other network devices 110. Network devices 110 may be connected via links 111. Links 111 may include one or more paths that permit communications between network devices 110, such as wired, wireless, and/or optical connections. A network device 110, configured as an LSR for example, may receive datagrams from an MPLS encryptor 130. Each network device 110, configured as an LSR along a label switched path (LSP), may make a forwarding decision based on the label carried in the MPLS header (e.g., an MPLS shim header). That is, the datagram forwarding process may be based on the concept of label switching. In this way, a LSP may identify the specific path of network devices 110 and links 111 that a datagram(s) takes through an MPLS network 120. The labeled datagram may be forwarded along the LSP by each network device 110 for example, until it eventually arrives at MPLS encryptor 130 that may be configured as an egress LSR. The MPLS header may be removed from the datagram by either egress MPLS encryptor 130 or by the network device LSR 110 preceding MPLS encryptor 130.

To optimize the route or path selection process, the physical path of a LSP may not be restricted to the shortest path that one or more routers executing an interior gateway protocol (IGP) would select to reach a destination. The physical path for a LSP may be defined using an explicit route. An explicit route may be a preconfigured sequence of network devices 110 (LSRs) that define the physical path of the LSP. Explicit routes may allow physical paths to be defined that override the shortest path routes established by conventional IP routing (e.g., by IGPs). For example, explicit routes may be used to route traffic around congested points in networks 120, to optimize resource utilization across networks 120, and/or to satisfy network and administrative policy constraints.

Networks 120 may include a group of network devices 110 interconnected by links 111 that form an MPLS network described above, for example. While four network devices 110 and five links 111 are shown in each network 120, more or fewer network devices 110 and links 111 may be used in other implementations consistent with the embodiments described herein. Networks 120 may also include other devices (not shown) that aid in forwarding data through network 120.

MPLS encryptors 130 may include one or more devices for receiving, encrypting and transmitting data between networks, for example. In one implementation, MPLS encryptors 130 may be configured as ingress LSRs (entry points of datagrams), and/or egress LSRs (exit points of datagrams) for networks 120. MPLS encryptors 130 may form a datagram, and may classify the datagram, based on a variety of factors, into a forwarding equivalent class (FEC). A FEC may include a set of datagrams that may be treated the same for forwarding purposes and may be mapped to a single label. A datagram may be encapsulated in a MPLS header that may contain a short, fixed-length, locally-assigned label that may be based on the FEC. MPLS encryptors 130 may forward a datagram with the MPLS header to the next-hop LSR, e.g., to a next network device 110.

Networks 140 may include one or more networks including an Internet-protocol (IP) network, a metropolitan area network (MAN), a wide area network (WAN), a local area network (LAN), or a combination of networks. In one implementation, networks 140 may be referred to as private or trusted networks. Networks 140 may also include devices, such as switches, routers, firewalls, gateways, and/or servers (not shown), used to transmit/receive data to/from other connected network devices.

Networks 140 may be a hardwired network using wired conductors and/or optical fibers and/or may be a wireless network using free-space optical and/or radio frequency (RF) transmission paths. Implementations of networks 140 and/or devices operating on networks 140 described herein are not limited to any particular data type and/or protocol.

Servers 150 may include one or more devices that perform functions, such as data storage and transmission, coder decoder (codec) conversion, and interfacing with client devices 160, other servers 150 and MPLS encryptors 130, for example. Servers 150 may also store information, such as network policies, quality of service (QoS) requirements and LSP labels that may be associated with a corresponding MPLS network. Servers 150 may also transmit/receive requests for LSP labels to/from other servers 150. Servers 150 may also communicate with MPLS encryptors 130 to establish QoS connections over a group of networks as described in detail below. In one implementation, server 150-1 may be associated with trusted networks 140, server 150-2 may be associated with MPLS network 120-1, and sever 150-3 may be associated with MPLS network 120-2.

Client devices 160 may include one or more devices that allow users to establish data connections and voice and/or video calls to other users. Client devices 160 may include personal computers, laptops, personal digital assistants, telephone devices and/or other types of communication devices.

Boundary 170, illustrated in FIG. 1 as a dashed line, may define a boundary between networks, 120 and 140 for example, where networks 140-1 and 140-2 may be networks of high trust and networks 120-1 and 120-2 may be networks of low trust. For example, a trusted network may be a private network and an untrusted network may be a public network, such as the Internet. As indicated above, networks 140-1 and 140-2 may be referred to as "trusted" networks, server 150-1 may be referred to as a "trusted" server, and client devices 160-1 and 160-2 may be referred to as "trusted" clients. Also, for example, networks 120-1 and 120-2 may be referred to as "untrusted" networks and servers 150-2 and 150-3 may be referred to as "untrusted" servers.

Figure 2:
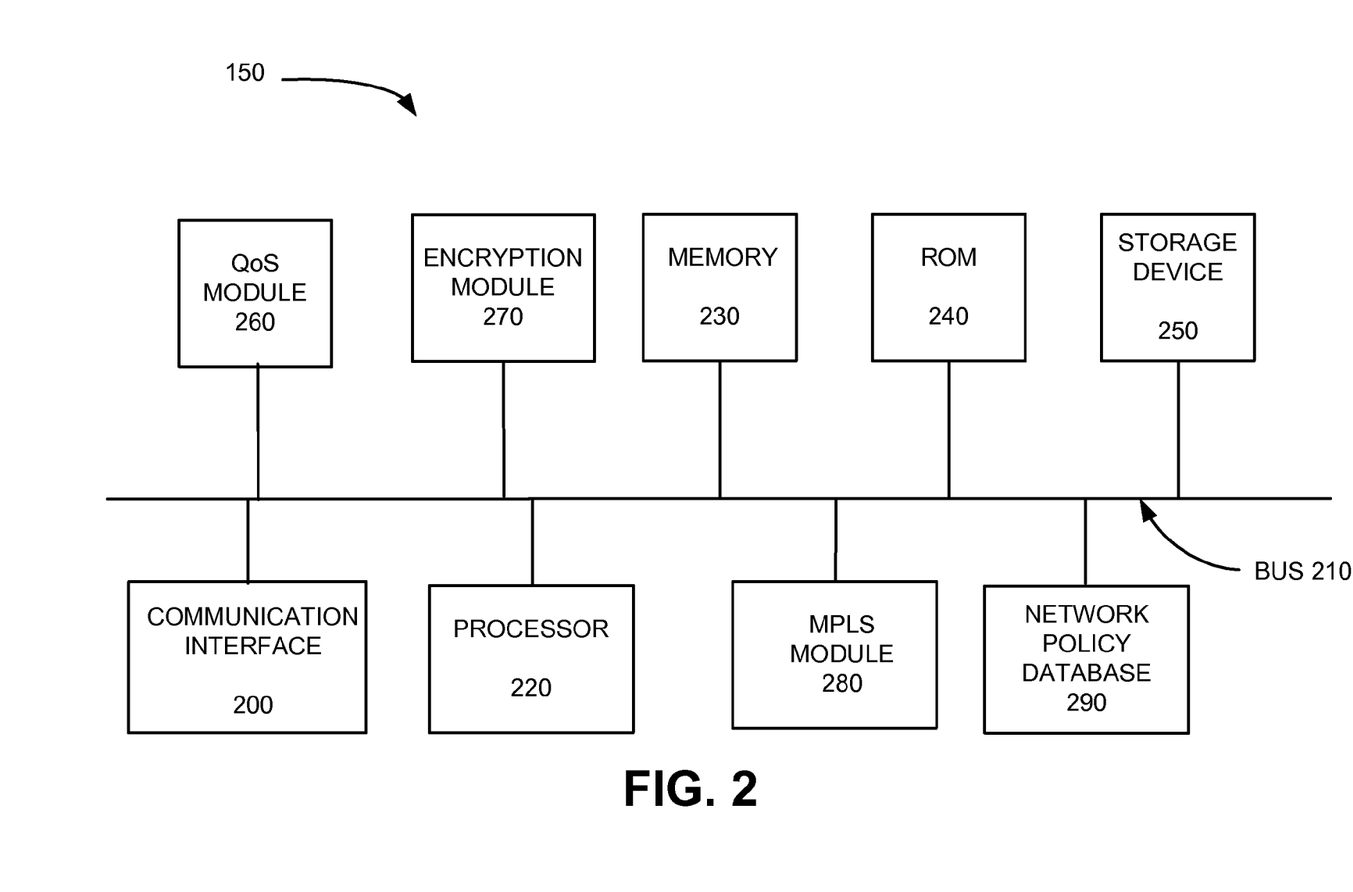
FIG. 2 is a diagram of an exemplary server as shown in FIG. 1.

FIG. 2 is a diagram of an exemplary configuration of server 150-1. Servers 150-2 and 150-3 may be similarly configured. Server 150-1 may include a communication interface 200, a bus 210, a processor 220, a memory 230, a read only memory (ROM) 240, a storage device 250, a QoS module 260, an encryption module 270, a MPLS module 280, and a network policy database 290. Bus 210 permits communication among the components of server 150-1. Server 150-1 may be configured in a number of other ways and may include other or different elements than illustrated in FIG. 2.

Communication interface 200 may include communication mechanisms that enable server 150-1 to communicate with other devices and/or systems. For example, communication interface 200 may include a modem or an Ethernet interface to a WAN or LAN. In addition, communication interface 200 may include other mechanisms for communicating via a network, such as a wireless network. Communication interface 200 may also include transmitters and receivers for communicating data to/from MPLS encryptors 130, servers 150-2 and 150-3 and client devices 160, for example.

Processor 220 may include any type of processor or microprocessor that interprets and executes instructions. Memory 230 may include a random access memory (RAM) or another dynamic storage device that stores information and instructions for execution by processor 220. Memory 230 may also be used to store temporary variables or other intermediate information during execution of instructions by processor 220.

ROM 240 may include a ROM device and/or another static storage device that stores static information and instructions for processor 220. Storage device 250 may include a magnetic disk or optical disk and its corresponding drive and/or some other type of magnetic or optical recording medium and its corresponding drive for storing information and instructions. Storage device 250 may also include a flash memory (e.g., an electrically erasable programmable read only memory (EEPROM)) device for storing information and instructions.

QoS module 260 may include one or more mechanisms that may provide quality of service information relating to communications and network policies. For example, QoS module 260 may store resource availability information that may be used to determine whether a particular level of QoS may be satisfied. QoS module 260 may receive a communication requesting a defined QoS connection over a group of networks and may store and provide QoS information associated with the group of networks. For example, QoS module 260 may provide bandwidth information for voice and/or video calls.

Encryption module 270 may include one or more mechanisms that may encrypt digital data before transmission over a network. For example, encryption module 270 may include software programs that may modify and encrypt data to be transmitted. Encryption module 270 may also generate, store, and/or transmit encryption keys to MPLS encryptors 130, for example.

MPLS module 280 may include, for example, data relating to LSP labels and data relating to establishing communications over a group of MPLS networks. For example, MPLS module 280 may store LPS labels associated with a corresponding network.

Network policy database 290 may store policies and information relating to a group of networks. For example, the stored policies and information contained in network policy database 290 for each of the networks may be authorization and/or validation policies and information identifying MPLS encryptors 130 that may be used for establishing communications through each network.

According to an exemplary implementation, server 150-1 may perform various processes in response to processor 220 executing sequences of instructions contained in memory 230. Such instructions may be read into memory 230 from another computer-readable medium, such as storage device 250, or from a separate device via communication interface 200. It should be understood that a computer-readable medium may include one or more memory devices or carrier waves. Execution of the sequences of instructions contained in memory 230 causes processor 220 to perform the acts that will be described hereafter. In alternative embodiments, hard-wired circuitry may be used in place of or in combination with software instructions to implement the embodiments. Thus, the systems and methods described are not limited to any specific combination of hardware circuitry and software.

Figure 3:
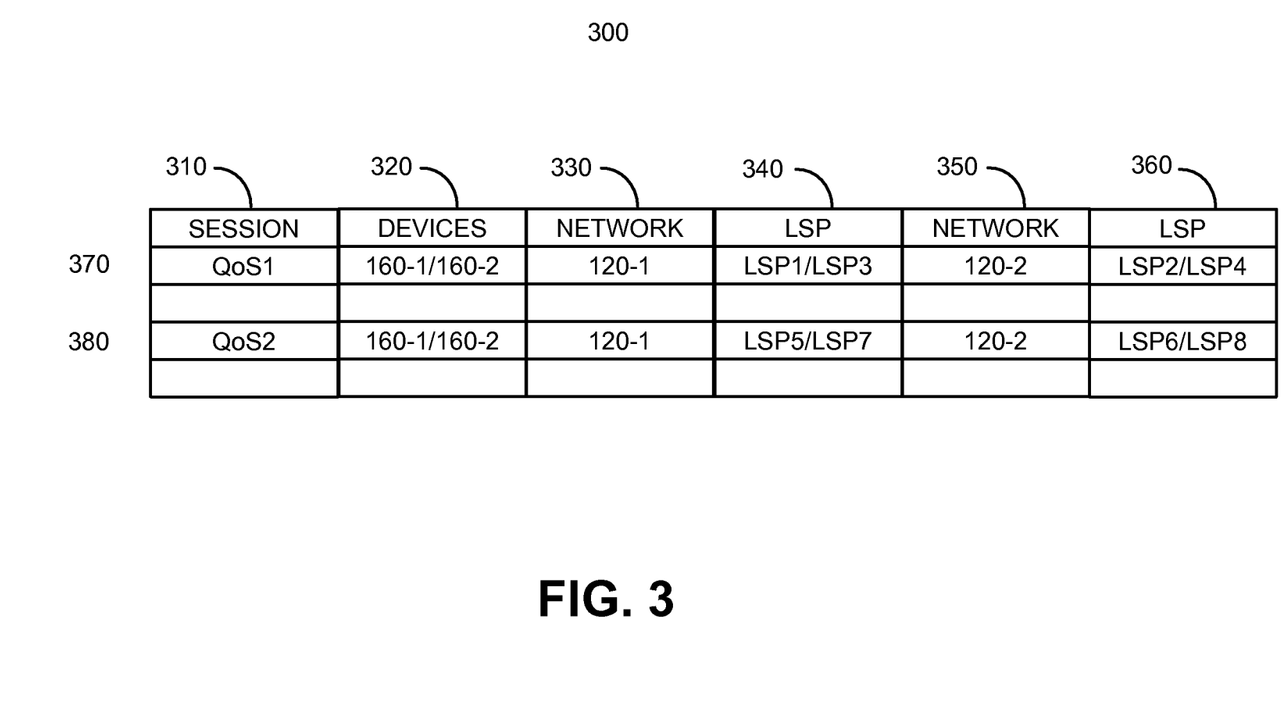
FIG. 3 is an exemplary data structure that may be stored in a server shown in FIG. 1.

FIG. 3 is an exemplary data structure that may be contained in MPLS module 280, in server 150-1, for example. Data structure 300 may be used by server 150-1 to establish a defined QoS connection over a group of networks.

Column 310 may contain session identifier information relating to a defined QoS connection. For example, column 310 may store information such as "QoS1" and "QoS2" that may define two different QoS connections.

Column 320 may contain information identifying devices that may be connected in a communication session identified in column 310. For example, column 320 may store "160-1" and "160-2" identifying client devices 160-1 and 160-2, that may be connected in a defined QoS communication session identified in column 310.

Column 330 may contain information identifying a network that may be used in establishing a defined QoS connection in column 310. For example, column 330 may store "120-1" to identify network 120-1 as being used to establish a QoS connection identified in column 310.

Column 340 may contain LSP labels used to establish defined QoS connections through a corresponding network identified in column 330. For example, column 340 may store "LSP1" and "LSP3," where LSP1 may be used to establish a forwarding connection through network 120-1 and LSP3 may be used to establish a returning connection through network 120-1.

Column 350 may store information relating to a second network that may be used in establishing the defined QoS connection identified in column 310. For example, column 350 may store "120-2" identifying network 120-2 as being used to establish a QoS connection identified in column 310.

Column 360 may store LSP labels used to establish defined QoS connections through the associated second network identified in column 350. For example, column 360 may store "LSP2" and "LSP4," where LSP2 may be used to establish a forwarding connection through network 120-2 and LSP4 may be used to establish a returning connection through network 120-2.

Row 370 may contain information in each of columns 310-360 that may be used to establish a connection through a group of networks for the defined QoS connection "QoS1." For example, information in columns 310-360 may establish a QoS1 connection from trusted network 140-1, though networks 120-1 and 120-2, to trusted network 140-2, where the quality of service of the established connection is QoS1.

Row 380 may contain information in each of columns 310-360 that may be used to establish a second defined QoS connection, through a group of untrusted networks with the defined QoS connection being "QoS2." For example, information in columns 310-360 may establish a QoS connection from trusted network 140-1, though networks 120-1 and 120-2, to trusted network 140-2, where the quality of service of the established connection is QoS2.

It will be appreciated that the columns shown in FIG. 3 are provided for simplicity. In practice, data structure 300 may include more or fewer columns than illustrated in FIG. 3. As will be explained in greater detail in FIGS. 6A-6C, MPLS module 280 in server 150-1 may receive, store and transmit the information as shown in FIG. 3.

Figure 4:
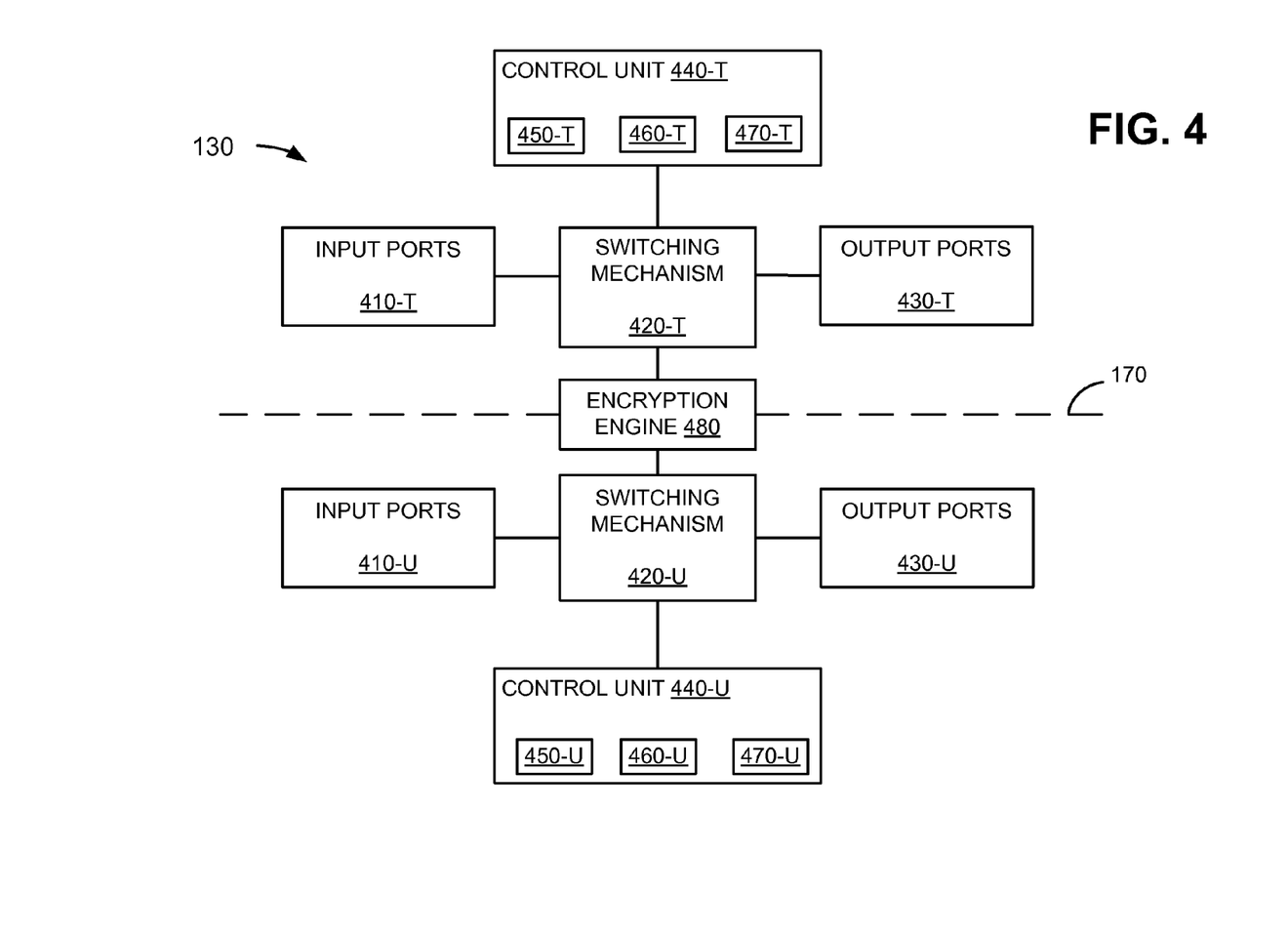
FIG. 4 is a diagram of an exemplary MPLS encryption device of FIG. 1.

FIG. 4 is a diagram of an exemplary MPLS encryptor 130-1. MPLS encryptors 130-2, 130-3 and 130-4 may be similarly configured. MPLS encryptor 130 may include input ports 410, switching mechanisms 420, output ports 430, control units 440 and encryption engine 480. Boundary 170 (as also shown in FIG. 1 as a dashed line) may define a boundary between trusted and untrusted sides of MPLS encryptor 130. For example, input ports 410, output ports 430, switching mechanism 420 and control unit 440 above line 170 may be referred to as "trusted" input ports, "trusted" output ports, "trusted" switching mechanism and "trusted" control unit. Likewise, input ports 410, output ports 430, switching mechanism 420 and control unit 440 below line 170 may be referred to as "untrusted" input ports, "untrusted" output ports, "untrusted" switching mechanism and "untrusted" control unit. In one implementation, encryption engine 480 may decrypt data received from the untrusted side of MPLS encryptor 130 that is destined for the trusted side of MPLS encryptor 130.

Input ports 410 may connect to networks 120 and 140 to receive data. For example, trusted input ports 410-T may receive data from a trusted network, such as network 140-1, and untrusted input ports 410-U may receive data from an untrusted network, such as network 120-1. Input ports 410 may include logic to carry out datalink layer encapsulation and decapsulation. Input ports 410 may also include logic to forward received data to switching mechanisms 420. Input ports 410 may receive data from networks 120 and 140 and may run datalink-level protocols and/or a variety of higher level protocols.

Switching mechanisms 420 may receive data from input ports 410 and determine a connection to output ports 430. Switching mechanisms 420 may be controlled by control units 440 in order to switch data to trusted output ports 430-T or switch data to untrusted output ports 430-U. Switching mechanisms 420 may be implemented using many different techniques. For example, switching mechanism 420 may include busses, crossbars, and/or shared memories. In one implementation, switching mechanism 420 may include a bus that links input ports 410 and output ports 430. A crossbar may provide multiple simultaneous data paths through switching mechanism 420. In a shared-memory switching mechanism 420, incoming datagrams may be stored in a shared memory and pointers to datagrams may be switched. Switching mechanism 420-T may also switch data to encryption engine 480, if the data received through trusted ports 410-T is destined for untrusted networks through untrusted output ports 430-U.

Output ports 430 may connect to networks 120 and 140 for data transmission. For example, trusted output ports 430-T may output data to be transmitted over a trusted network, such as network 140-1 and untrusted output ports 430-U may output data to be transmitted over an untrusted network, such as network 120-1. Output ports 430 may include logic executing scheduling algorithms that support priorities and guarantees and may run datalink-level protocols and/or a variety of higher level protocols.

Control units 440 may control switching mechanisms 420 to interconnect input ports 410 to output ports 430 (and to encryption engine 480 in some instances). For example, control unit 440-U may enable switching mechanism 420-U to connect an untrusted input port 410-U to an untrusted output port 430-U or may enable switching mechanisms 420-T to direct a transmission through encryption engine 480 to switching mechanism 420-U for connection to an untrusted output port 430-U for example. Control unit 440-T may enable switching mechanism 420-T to connect a trusted input port 410-T to a trusted output port 430-T or may enable switching mechanisms 420-T to direct a transmission through encryption engine 480 to switching mechanism 420-U for connection to an untrusted output port 430-U for example. Control units 440 may also implement routing protocols, and/or run software to configure transmissions between networks 120 and 140.

In one implementation, control units 440 may include a transmission guard 450, a processor 460 and a memory 470. Transmission guard 450 may include hardware and software mechanisms that may direct or prohibit transmissions between trusted and untrusted networks. For example, transmission guard 450 may direct transmissions from trusted networks 140 through switching mechanisms 420 and encryption engine 480 to untrusted networks 120. Transmission guard 450 may also block transmissions from untrusted networks 120 from entering into trusted networks 140, for example. Processor 460 may include a microprocessor or processing logic that may interpret and execute instructions. Memory 470 may include a RAM, ROM device, a magnetic and/or optical recording medium and its corresponding drive, and/or another type of static and/or dynamic storage device that may store information and instructions for execution by processor 460. Memory 470 may also store a label information base (LIB) as described below.

Encryption engine 480 may encrypt data that may be transmitted from trusted side of MPLS encryptor 130 to the untrusted side of MPLS encryptor 130. Encryption engine 480 may include one or more mechanisms for encrypting and decrypting data.

Figure 5:
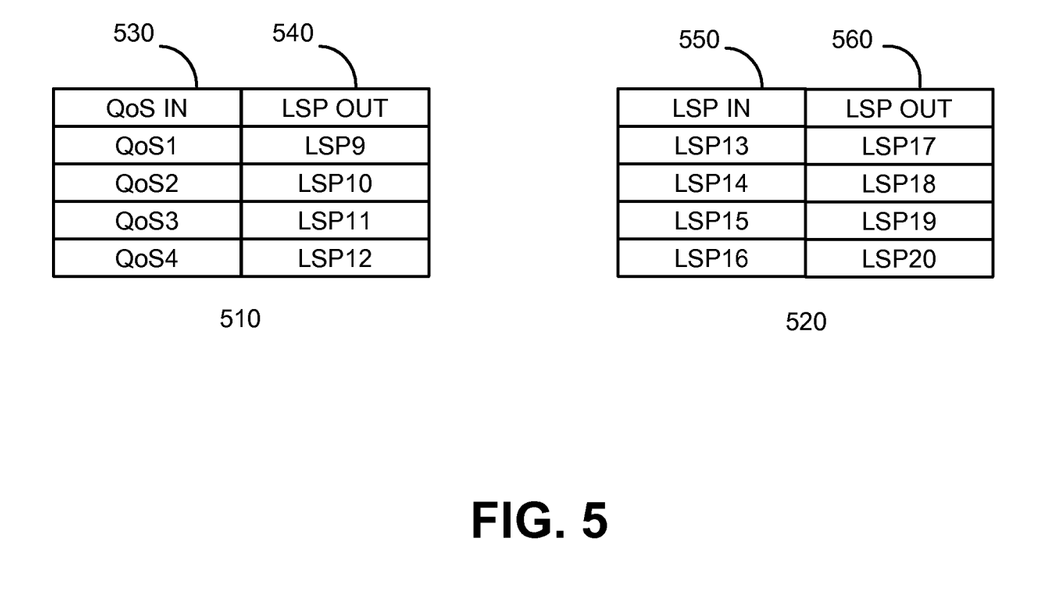
FIG. 5 shows exemplary data tables that may be stored in exemplary MPLS encryptor device.

In order to set up an LSP through a network 120, each of the trusted and untrusted sides of MPLS encryptors 130 may set up a LIB in memory 470, which may map data with an incoming QoS or LSP label to an outgoing LSP label. For example, LIB 510 stored in memory 470-T in the trusted side of MPLS encryptors 130, may contain two associated columns in a table, as shown in FIG. 5. A first column 540 of LIB 510 may store LSP labels for communications over untrusted networks 120, and a second column 530 of LIB 510 may store QoS information received from trusted communications via trusted networks 140, that may be associated with an LSP label in column 540. LIB 520 stored in memory 470 in the untrusted side of MPLS encryptors 130 may store two columns of associated LSP labels which may map data with an incoming LSP label (column 550) to an outgoing LSP label (column 560). The LIB data tables in trusted and untrusted sides of MPLS encryptors 130 shown in FIG. 5 are provided for explanatory purposes only. These tables 510 and 520 may include additional information than illustrated in FIG. 5.

Upon receiving data from trusted client 160-1 via a trusted input port 410-T, for example, LIB 510 may map QoS information received with the data from trusted client device 160-1 to an appropriate entry in the second column of LIB 510. LIB 510 may then identify an associated LSP label (from column 540) that may be applied to the received data for transmission through untrusted network 120-1 with the requested QoS, for example. In this example, data received via a trusted input port 410-T may pass through encryption engine 480, for encryption, prior to being sent to an untrusted output port 430-U. In this manner, data transmissions received from trusted network 140-1 may be encrypted and labeled with an LSP label, before transmission to untrusted network 120-1, without allowing untrusted network 120-1 to access the data received from trusted network 140-1, for example.

After data has been encrypted, labeled and output by MPLS encryptor 130, network devices 110 may forward the data as a datagram along links 111 through MPLS networks 120 based on the LSP label applied. An LSP label may be swapped to a new label at each network device 110. In this way, an LSP label may identify the specific path of network devices 110 and links 111 that a datagram may take through MPLS network 120.

MPLS encryptors 130, consistent with principles of the embodiments, may perform certain operations, as described in detail below. MPLS encryptors 130 may perform these operations in response to processors 460 executing software instructions contained in a computer-readable medium, such as memory 470.

The software instructions may be read into memory 470 from another computer-readable medium, such as a data storage device, or from another device via a communication interface. The software instructions contained in memory 470 may cause processor 460 to perform processes that will be described later. Alternatively, hardwired circuitry may be used in place of or in combination with software instructions to implement processes consistent with principles of various embodiments. Thus, implementations consistent with principles of exemplary embodiments are not limited to any specific combination of hardware circuitry and software.

FIG. 5 shows exemplary data tables that may be contained in MPLS encryptors 130, for example.

Data table 510 may be contained in trusted memory 470-T of MPLS encryptors 130. Data table 510 may be used to map received data with a defined QoS from trusted networks 140, to an LSP label for transmission through untrusted networks 120, for example.

Column 530 of data table 510 may contain information identifying a defined QoS connection. For example, column 530 may store "QoS1," "QoS2," "QoS3" and "QoS4" that may represent information identifying four differently defined QoS connections.

Column 540 may contain an LSP label associated with establishing the corresponding defined QoS connection in column 530. For example, column 540 may store "LSP9," "LSP10," "LSP11" and "LSP12," that may be used to establish connections through untrusted networks 120 with the corresponding QoS in column 530. For example, if data is received for QoS3 from trusted network 140-1, LSP11 may be applied to the data to provide the defined QoS through untrusted network 120-1.

Data table 520 may be contained in untrusted memory 470-U of MPLS encryptors 130. For example, data table 520 may be used to map data with an incoming LSP label from a first untrusted network 120 to an outgoing LSP label for transmission through a second untrusted network 120.

Column 550 of data table 520 may contain information identifying an LSP label received through untrusted input port 410-U. For example, column 550 may store "LSP13," "LSP14," "LSP15" and "LSP16," that may identify LSP labels that may be received from untrusted networks 120. Incoming data with LSP labels in column 550 may be mapped to corresponding outgoing LSP labels in column 560.

Column 560 may contain an LSP label used to label data for transmission through an untrusted network 120, for example. For example, column 560 may store "LSP17," "LSP18," "LSP19" and "LSP20," that may be used to transmit data through untrusted networks 120. For example, if data is received from untrusted network 120-1 through untrusted port 430-U with incoming label "LSP15," corresponding outgoing label "LSP19" may be applied to the data for transmission through untrusted network 120-2.

Figure 6A:
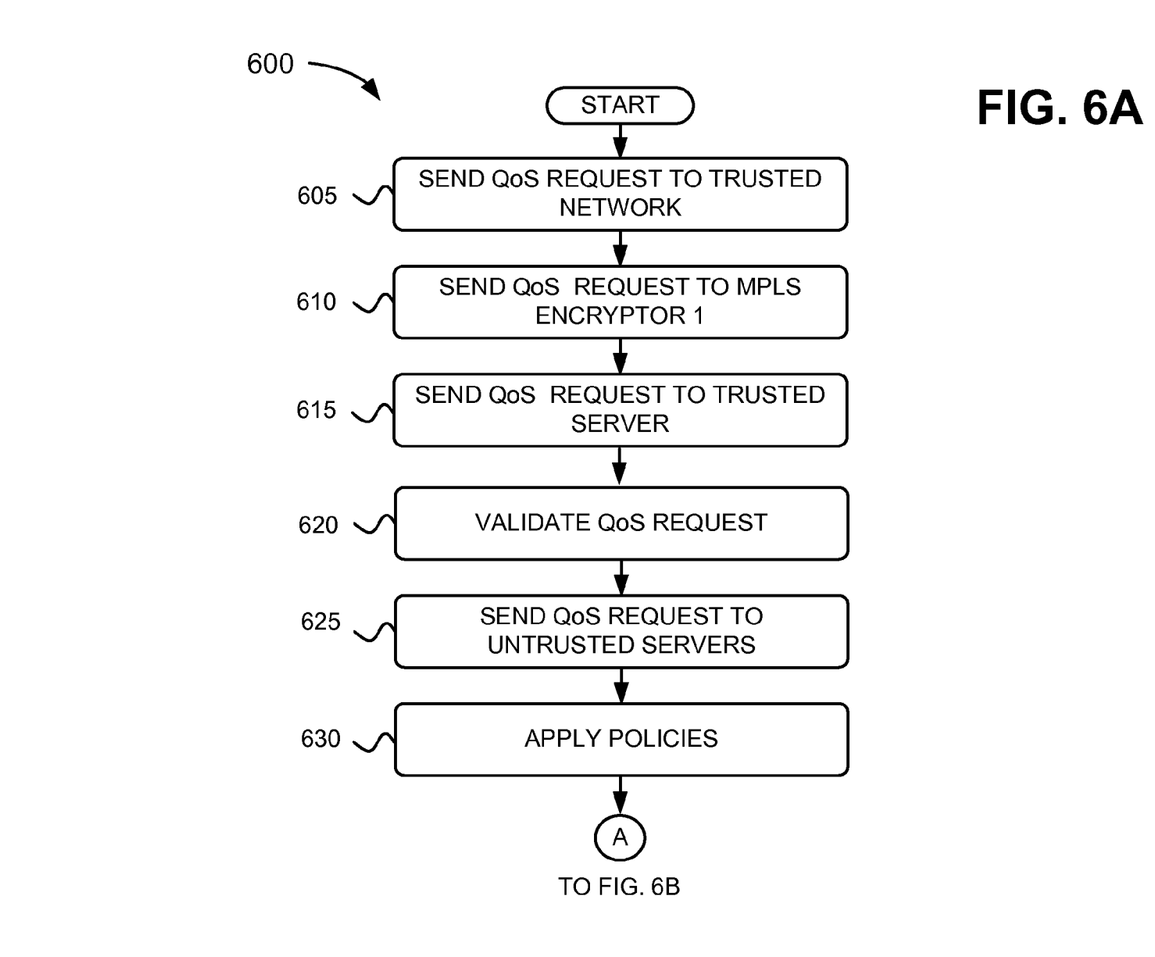
FIGS. 6A-6C are flow diagrams illustrating exemplary processing performed by the system of FIG. 1.
Figure 6B:
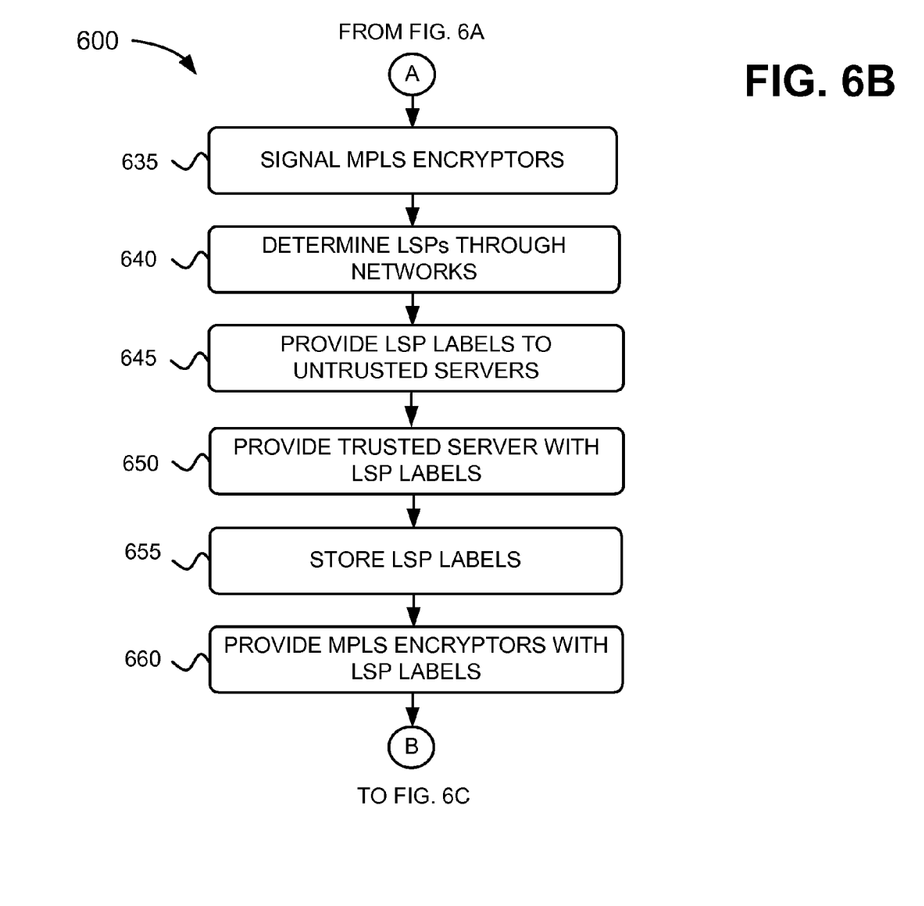
Figure 6C:
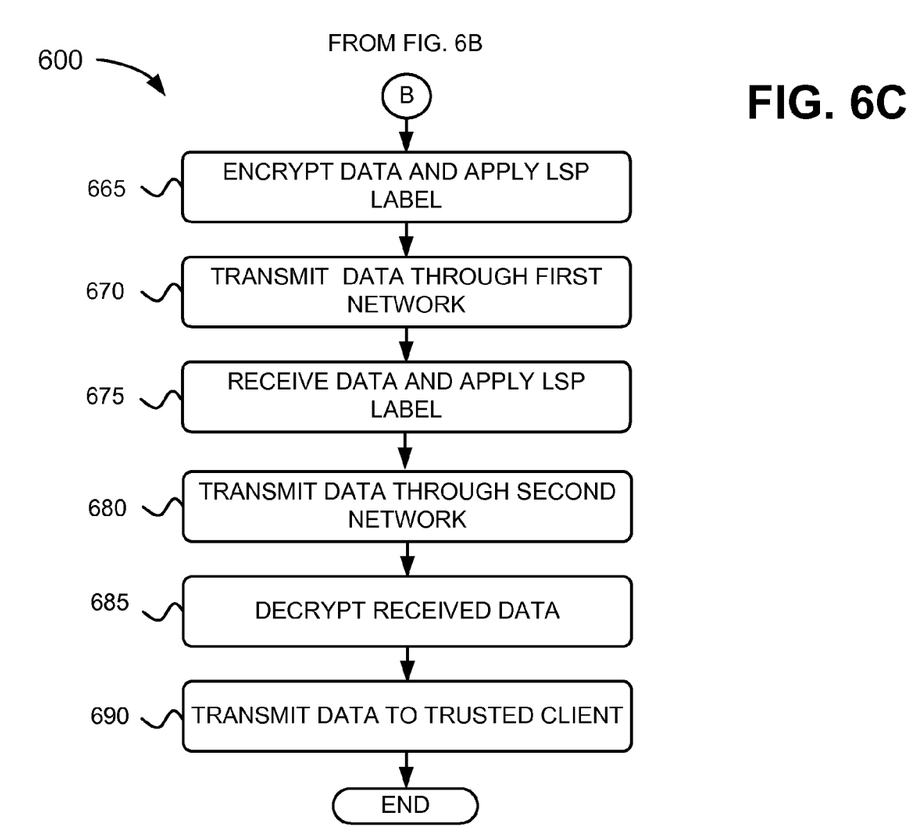

FIGS. 6A to 6C illustrate exemplary processing 600 performed by system 100. In one implementation for example, processing 600 may begin when a trusted client, such as 160-1, sends a QoS request to a trusted network, such as network 140-1 (act 605). For example, client 160-1 may desire to establish a video call to client 160-2 that uses a high QoS connection. Trusted network 140-1 may then send this request for QoS to MPLS encryptor 130-1 (act 610). In response to receiving this request, MPSL encryptor 130-1 may forward the QoS request to trusted server 150-1 (act 615). Upon receiving this QoS request, trusted server 150-1 may validate the request (act 620). For example, trusted server 150-1 may access QoS module 260 to determine required bandwidth for the QoS connection and determine whether network resources are available for the request. Server 150-1 may also access network policy database 290 to determine networks needed to establish the requested QoS connection. Trusted server 150-1 may then transmit a QoS request to untrusted servers (act 625). For example, trusted server 150-1 may determine (in act 620) that networks 120-1 and 120-2 may be needed to establish the requested QoS connection from client devices 160-1 to 160-2. Trusted server 150-1 may then transmit a QoS request through MPLS encryptor 130-3 to untrusted server 150-2 (which is associated with network 120-1) through network 120-1 for establishing an LSP through network 120-1 and may transmit a separate QoS request to untrusted server 150-3 (which is associated with network 120-2) through untrusted network 120-2 for establishing an LSP through network 120-2.

Untrusted servers 150-2 and 150-3 may then receive the requests for a defined QoS and apply policies necessary to establish the requested service (act 630). For example, untrusted servers 150-2 and 150-3 may contain a QoS module 260 similar to that shown in FIG. 2, that may store bandwidth information relating to establishing defined QoS connections through networks 120-1 and 120-2. Once untrusted servers 150-2 and 150-3 validate the QoS requests, untrusted servers 150-2 and 150-3 may each transmit a request for service to an MPLS encryptors 130-1, 130-2, 130-3 or 130-4 (act 635, FIG. 6B). For example, untrusted servers 150-2 and 150-3 may each contain a network policy database 290 that may store information identifying MPLS encryptors that may be used to establish connections through network 120-1 and 120-2. Untrusted server 150-2 (associated with network 120-1) may signal MPLS encryptors 130-1 and 130-4 via network 120-1, that a connection may be established from MPLS encryptor 130-1 to MPLS encryptor 130-4. Untrusted server 150-3 (associated with network 120-2) may signal MPLS encryptors 130-4 and 130-2 via network 120-2, that a connection may be established from MPLS encryptor 130-4 to MPLS encryptor 130-2. It should be understood that servers 150-2 and 150-3 operate independently and do not communicate with one another.

MPLS encryptors 130 may then determine LSPs to establish the requested QoS connection through the untrusted networks 120-1 and 120-2 (act 640). For example, untrusted control units 440-U of MPLS encryptors 130-1 and 130-4 may initiate an LSP and create an entry in data table 520 (as stored in untrusted memory units 470-U) to determine an LSP label that may be used to form the requested QoS connection through untrusted network 120-1. Also in this example, MPLS encryptors 130-2 and 130-4 may initiate an LSP and create an entry in data table 520 stored in untrusted memory units 470-U, to determine an LSP label used to form the requested QoS connection through untrusted network 120-2. Once LSP labels have been determined, MPLS encryptors 130 may provide the LSP labels to the untrusted servers 150-2 and 150-3 (act 645). For example, server 150-2 receives LSP labels for network 120-1 and server 150-3 receives LSP labels for network 120-2. After receiving LSP labels from the MPLS encryptors 130, untrusted servers 150-2 and 150-3 may provide trusted server 150-1 with the LSP labels (act 650). For example, untrusted server 150-2 may provide LSP labels "LSP1" and "LSP3" to server 150-1 and untrusted server 150-3 may provide LSP labels "LSP2" and "LSP4" to trusted server 150-1.

Trusted server 150-1 may then store these received LSP labels (act 655). For example, trusted server 150-1 may store the LSP labels in a data structure as shown in FIG. 3. Trusted server 150-1 may then provide MPLS encryptors 130 with LSP labels to establish connections over untrusted networks 120 (act 660). For example, trusted server 150-1 may transmit QoS1 information and label LSP1 that may be stored in data table 510 in MPLS encryptor 130-1 to establish a forwarding connection from network 140-1 through untrusted network 120-1 to MPLS encryptor 130-4. Server 150-1 may transmit LSP3 to be stored in data table 520 of MPLS encryptor 130-4 to establish a returning connection through untrusted network 120-1 to MPLS encryptor 130-1. Similarly, trusted server 150-1 may transmit LSP2 to MPLS encryptor 130-4 in order to establish a connection through untrusted network 120-2 to MPLS encryptor 130-2. Trusted server 150-1 may transmit QoS1 information and LSP4 to be stored in data table 510 of MPLS encryptor 130-2 to establish a returning connection through untrusted network 120-2 to MPLS encryptor 130-4. Trusted server 150-1 may also provide MPLS encryptors 130 with encryption and decryption keys that may be used by encryption engine 480 to encrypt/decrypt data.

MPLS encryptor 130-1 may then encrypt data received from trusted client 160-1 and apply an LSP label (act 665, FIG. 6C). For example, encryption engine 480 may apply encryption processing on the received data from trusted network 140-1. After encryption, MPLS encryptor 130-1 may apply an LSP label. For example, using LIB 510 stored in memory 470-T of trusted control unit 440-T, the received data from trusted client 160-1 is mapped to an appropriate LSP label (LSP1) for transmission through untrusted network 120-1. The encrypted and LSP labeled data may then be transmitted through untrusted network 120-1 (act 670). This data may then be received by MPLS encryptor 130-4, for example. Once received by MPLS encryptor 130-4, another LSP label may be applied (act 675). For example, LIB 520 in memory 470-U of untrusted side of MPLS encryptor 130-4, may map the received data to "LSP2" for transmission through network 120-2 to MPLS encryptor 130-2, for example. Once the appropriate label has been applied, MPLS encryptor 130-4 may transmit the data through untrusted network 120-2 (act 680).

MPLS encryptor 130-2 may then receive the transmitted data from MPLS encryptor 130-4. Once received, MPLS encryptor 130-2 may remove the label and decrypt the received data (act 685). After decryption, MPLS encryptor 130-2 may transmit the data to trusted client 160-2 (act 690).

In this manner, process 600 may provide requested QoS communications between two trusted networks (140-1 and 140-2) over a group of untrusted networks 120, without signals being transmitted directly from a trusted network 140 through a group of untrusted networks 120 indicating that a specific QoS may be required. It should also be understood that process 600 is exemplary, and more than two untrusted MPLS networks 120 may be included between trusted networks 140, for example. In this case, the exemplary acts as described above may also be applied to all of the networks. For example, trusted server 150-1 may request and receive LSP labels from any number of untrusted MPLS networks 120 and establish a connection that traverse two or more untrusted networks. Similarly, trusted server 150-1 may transmit LSP labels to any number of MPLS encryptors 130, in order to establish a defined QoS connection through the group of untrusted networks 120.

The foregoing description of exemplary embodiments provides illustration and description, but is not intended to be exhaustive or to limit the embodiments to the precise form disclosed. Modifications and variations are possible in light of the above teachings or may be acquired from practice of the embodiments.

Also, while series of acts have been described with regard to the flowcharts of FIGS. 6A-6C, the order of the acts may differ in other implementations consistent with principles of the embodiments. Further, non-dependent acts may be performed in parallel.

No element, act, or instruction used in the present application should be construed as critical or essential to the systems and methods described herein except when explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    transmitting, from a network device, a request to each of a plurality of untrusted multi-protocol label switching (MPLS) networks for a label switched path (LSP) label,
        where each LSP label provides a defined quality of service connection through a corresponding untrusted MPLS network, and
        where the network device is a first MPLS network device communicatively coupled to a first trusted network device through a first trusted network;
    at the network device, receiving, from each of the plurality of untrusted MPLS networks, a corresponding LSP label; and
    establishing a label switched path from the first trusted network device to a second trusted network device through the plurality of untrusted MPLS networks,
        where establishing the label switched path from the first trusted network device to the second trusted network device further comprises:
            transmitting, from the first MPLS network device, an LSP label to a trusted server that transmits the LSP label to a second MPLS network device that is communicatively coupled to the second trusted network device through a particular untrusted MPLS network.

2. The method of claim 1, where transmitting the request to each of the plurality of untrusted MPLS networks for the LSP label further comprises:
    transmitting the request to a plurality of servers,
        where each server, of the plurality of servers, is associated with only a particular one of the plurality of untrusted MPLS networks.

3. The method of claim 1, where the established label switched path provides the defined quality of service connection.

4. The method of claim 1 further comprising:
    receiving a data packet from the first trusted network device;
    encrypting the data packet using encryption that does not allow the plurality of untrusted MPLS networks to access data in the data packet; and
    transmitting, through the plurality of untrusted MPLS networks, the encrypted data packet to a decryption device communicatively coupled to the second trusted network device through a trusted network.

5. The method of claim 1,
    where the plurality of untrusted MPLS networks comprises different first and second untrusted MPLS networks,
    where the first untrusted MPLS network comprises a first set of servers that stores at least one of network policies, quality of service requirements, or LSP labels associated with the first untrusted MPLS network, and
    where the second untrusted MPLS network comprises a different second set of servers that stores at least one of network policies, quality of service requirements, or LSP labels associated with the second untrusted MPLS network.

6. The method of claim 5, where
    the first set of servers is associated with the first untrusted MPLS network but not the second untrusted MPLS network, and
    the second set of servers is associated with the second untrusted MPLS network but not the first untrusted MPLS network.

7. The method of claim 1, where the label switched path includes at least two network devices that each apply an LSP label to data transmitted from the first trusted network device to the second trusted network device through the established label switched path.

8. A trusted network device comprising:
    a memory to store a plurality of label switched path (LSP) labels,
        where each LSP label, of the plurality of LSP labels, identifies a connection through a corresponding untrusted multi-protocol label switching (MPLS) network with a defined quality of service; and
    a processor to execute instructions to:
        transmit a request to a plurality of untrusted MPLS networks for an LSP label,
            where the trusted network device is communicatively coupled to a first MPLS network device through a first trusted network;
        receive an LSP label from each of the plurality of untrusted MPLS networks;
        store the LSP label from each of the plurality of untrusted MPLS networks in the memory; and
        cause a connection to be established, from the trusted network device to another trusted network device through the plurality of untrusted MPLS networks, with the defined quality of service,
            the connection being established based on an LSP label being transmitted, from the first MPLS network device, to a trusted server that transmits the LSP label to a second MPLS network device that is communicatively coupled to the other trusted network device through a particular untrusted MPLS network.

9. The trusted network device of claim 8, where the processor is further to:
    receive a request for the defined quality of service from a first client device.

10. The trusted network device of claim 9, where the connection provided through the plurality of untrusted MPLS networks with the defined quality of service connects the first client device to a second client device.

11. The trusted network device of claim 10, where the first and second client devices are in trusted networks.

12. A non-transitory computer readable medium storing instructions, the instructions comprising:
    one or more instructions which, when executed by a processor of a network device, cause the processor to:
        transmit a request to each of a plurality of untrusted multi-protocol label switching (MPLS) networks for a label switched path (LSP) label,
            where each LSP label provides a defined quality of service connection through a corresponding untrusted MPLS network, and
            where the network device is a first MPLS network device communicatively coupled to a first trusted network device through a first trusted network;
        receive, from each of the plurality of untrusted MPLS networks, a corresponding LSP label; and
        establish a label switched path from the first trusted network device to a second trusted network device through the plurality of untrusted MPLS networks,
            where the one or more instructions to establish the label switched path from the first trusted network device to the second trusted network device further include:
                one or more instructions to transmit, from the first MPLS network device, an LSP label to a trusted server that transmits the LSP label to a second MPLS network device that is communicatively coupled to the second trusted network device through a particular untrusted MPLS network.

13. The medium of claim 12, where the one or more instructions to transmit the request to each of the plurality of untrusted MPLS networks for the LSP label further include:
one or more instructions to transmit the request to a plurality of servers,
where each server, of the plurality of servers, is associated with only a particular one of the plurality of untrusted MPLS networks.

14. The medium of claim 12, where the instructions further include:
one or more instructions to receive a data packet from the first trusted network device;
one or more instructions to encrypt the data packet using encryption that does not allow the plurality of untrusted MPLS networks to access data in the data packet; and
one or more instructions to transmit, through the plurality of untrusted MPLS networks, the encrypted data packet to a decryption device communicatively coupled to the second trusted network device through a trusted network.

15. The medium of claim 12,
where the plurality of untrusted MPLS networks comprises different first and second untrusted MPLS networks,
where the first untrusted MPLS network comprises a first set of servers that stores at least one of network policies, quality of service requirements, or LSP labels associated with the first untrusted MPLS network, and
where the second untrusted MPLS network comprises a different second set of servers that stores at least one of network policies, quality of service requirements, or LSP labels associated with the second untrusted MPLS network.

16. The medium of claim 12, where the label switched path includes at least two network devices that each apply an LSP label to data transmitted from the first trusted network device to the second trusted network device through the established label switched path.

17. A system comprising:
a network device to:
transmit a request to each of a plurality of untrusted multi-protocol label switching (MPLS) networks for a label switched path (LSP) label,
where each LSP label provides a defined quality of service connection through a corresponding untrusted MPLS network, and
where the network device is a first MPLS network device communicatively coupled to a first trusted network device through a first trusted network;
receive, from each of the plurality of untrusted MPLS networks, a corresponding LSP label; and
establish a label switched path from the first trusted network device to a second trusted network device through the plurality of untrusted MPLS networks,
where the one or more instructions to establish the label switched path from the first trusted network device to the second trusted network device further include:
one or more instructions to transmit, from the first MPLS network device, an LSP label to a trusted server that transmits the LSP label to a second MPLS network device that is communicatively coupled to the second trusted network device through a particular untrusted MPLS network.

18. The system of claim 17, where the network device, when transmitting the request to each of the plurality of untrusted MPLS networks for the LSP label, is further to:
transmit the request to a plurality of servers,
where each server, of the plurality of servers, is associated with only a particular one of the plurality of untrusted MPLS networks.

19. The system of claim 17, where the network device is further to:
receive a data packet from the first trusted network device;
encrypt the data packet using encryption that does not allow the plurality of untrusted MPLS networks to access data in the data packet; and
transmit, through the plurality of untrusted MPLS networks, the encrypted data packet to a decryption device communicatively coupled to the second trusted network device through a trusted network.

20. The system of claim 17,
where the plurality of untrusted MPLS networks comprises different first and second untrusted MPLS networks,
where the first untrusted MPLS network comprises a first set of servers that stores at least one of network policies, quality of service requirements, or LSP labels associated with the first untrusted MPLS network, and
where the second untrusted MPLS network comprises a different second set of servers that stores at least one of network policies, quality of service requirements, or LSP labels associated with the second untrusted MPLS network.

* * * * *